May 6, 1958 F. P. SHARPE 2,833,328
APPARATUS FOR MANUFACTURING WHEEL RIMS
BY A PLURALITY OF DIES MECHANISMS
Filed April 13, 1953 8 Sheets-Sheet 1
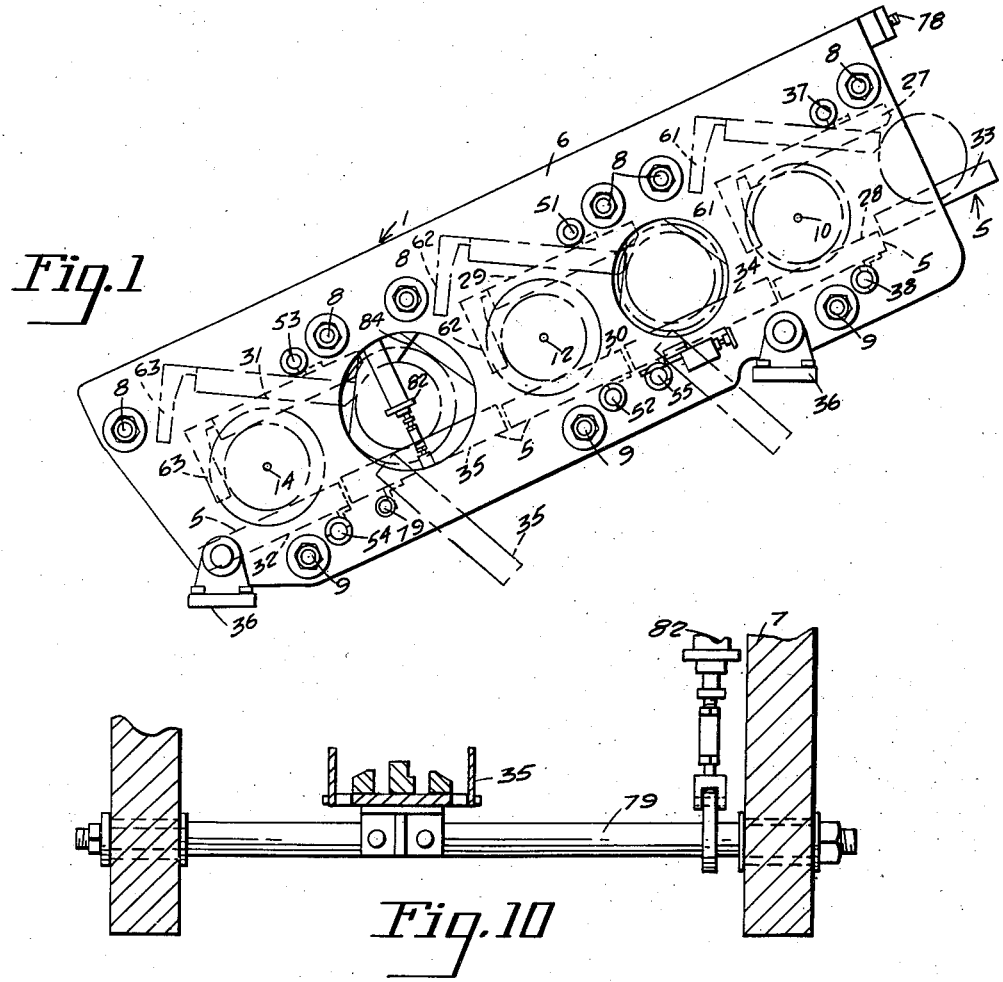
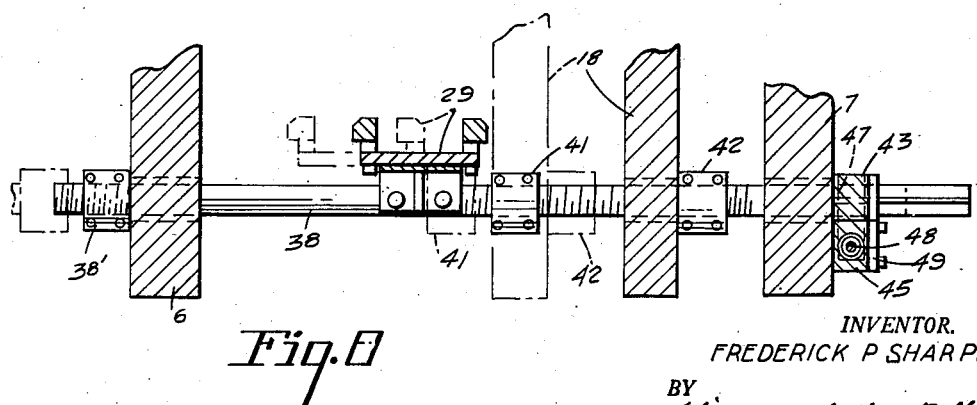
INVENTOR.
FREDERICK P SHARPE.
BY
Whittemore Hulbert & Belknap May 6, 1958

F. P. SHARPE 2,833,328

APPARATUS FOR MANUFACTURING WHEEL RIMS
BY A PLURALITY OF DIES MECHANISMS

Filed April 13, 1953

INVENTOR.
FREDERICK P SHARPE.

BY

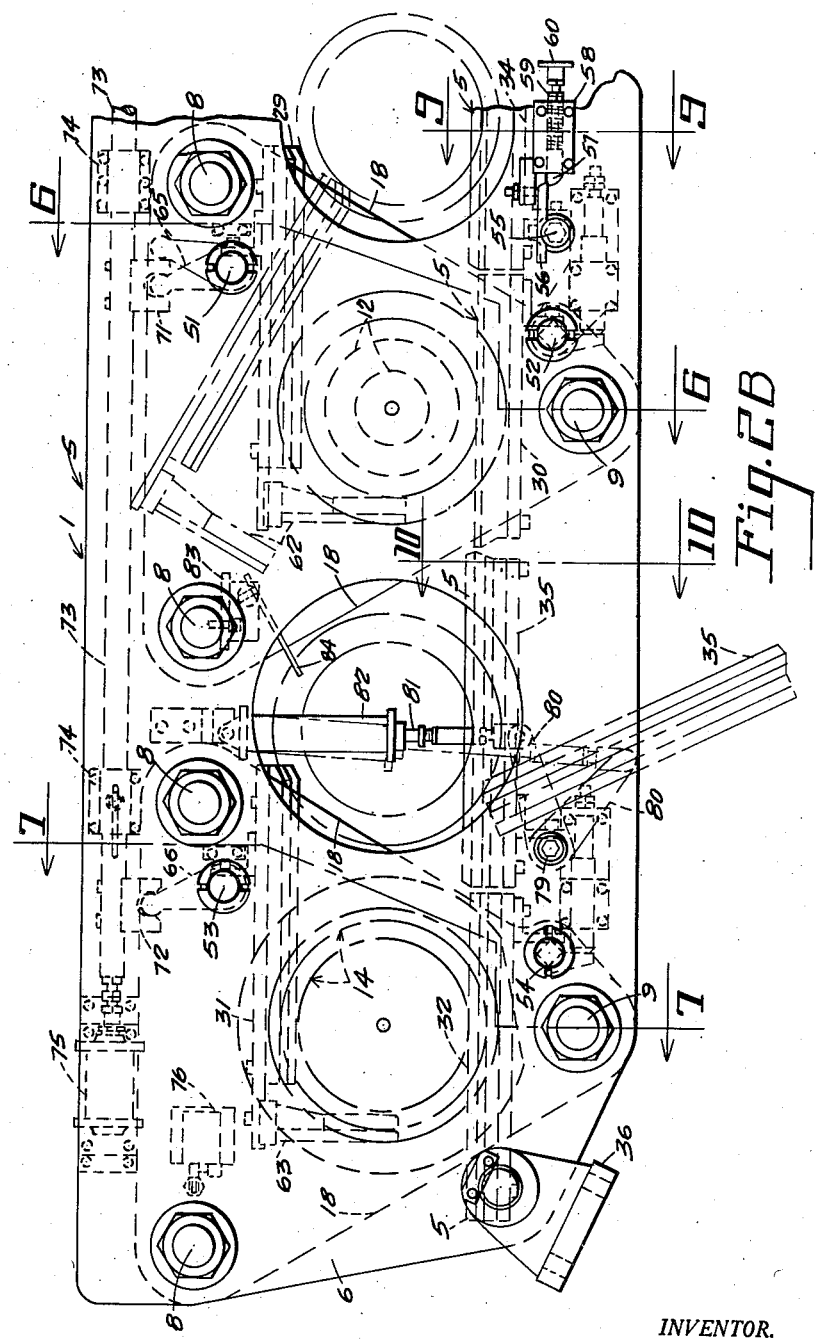

May 6, 1958 F. P. SHARPE 2,833,328
APPARATUS FOR MANUFACTURING WHEEL RIMS
BY A PLURALITY OF DIES MECHANISMS
Filed April 13, 1953 8 Sheets-Sheet 4

INVENTOR.
FREDERICK P SHARPE.
BY
*Whittemore Hulbert & Belknap*

May 6, 1958 F. P. SHARPE 2,833,328
APPARATUS FOR MANUFACTURING WHEEL RIMS
BY A PLURALITY OF DIES MECHANISMS
Filed April 13, 1953 8 Sheets-Sheet 5

INVENTOR.
FREDERICK P. SHARPE.
BY

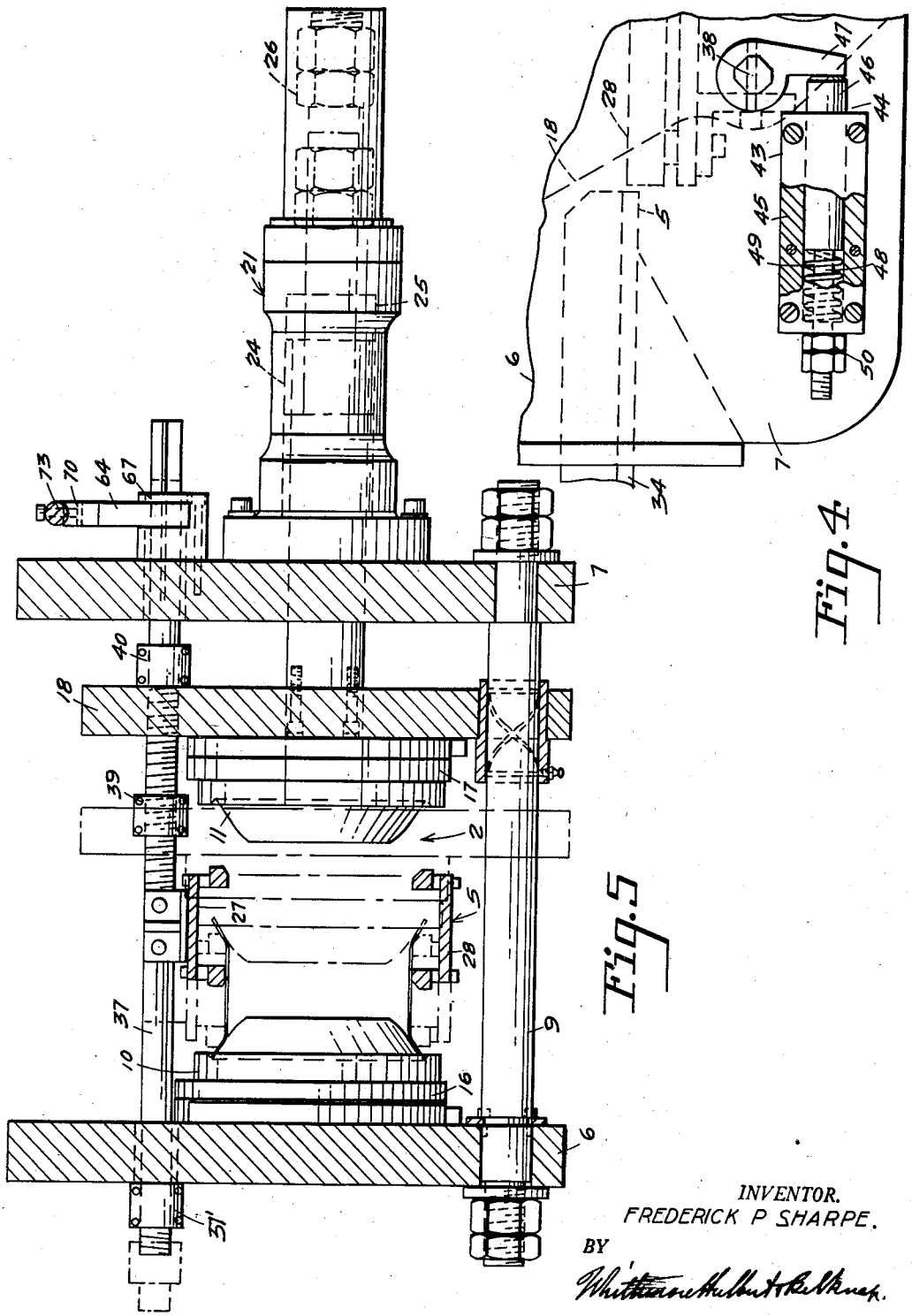

May 6, 1958 F. P. SHARPE 2,833,328
APPARATUS FOR MANUFACTURING WHEEL RIMS
BY A PLURALITY OF DIES MECHANISMS
Filed April 13, 1953 8 Sheets-Sheet 7

INVENTOR.
FREDERICK P SHARPE.
BY

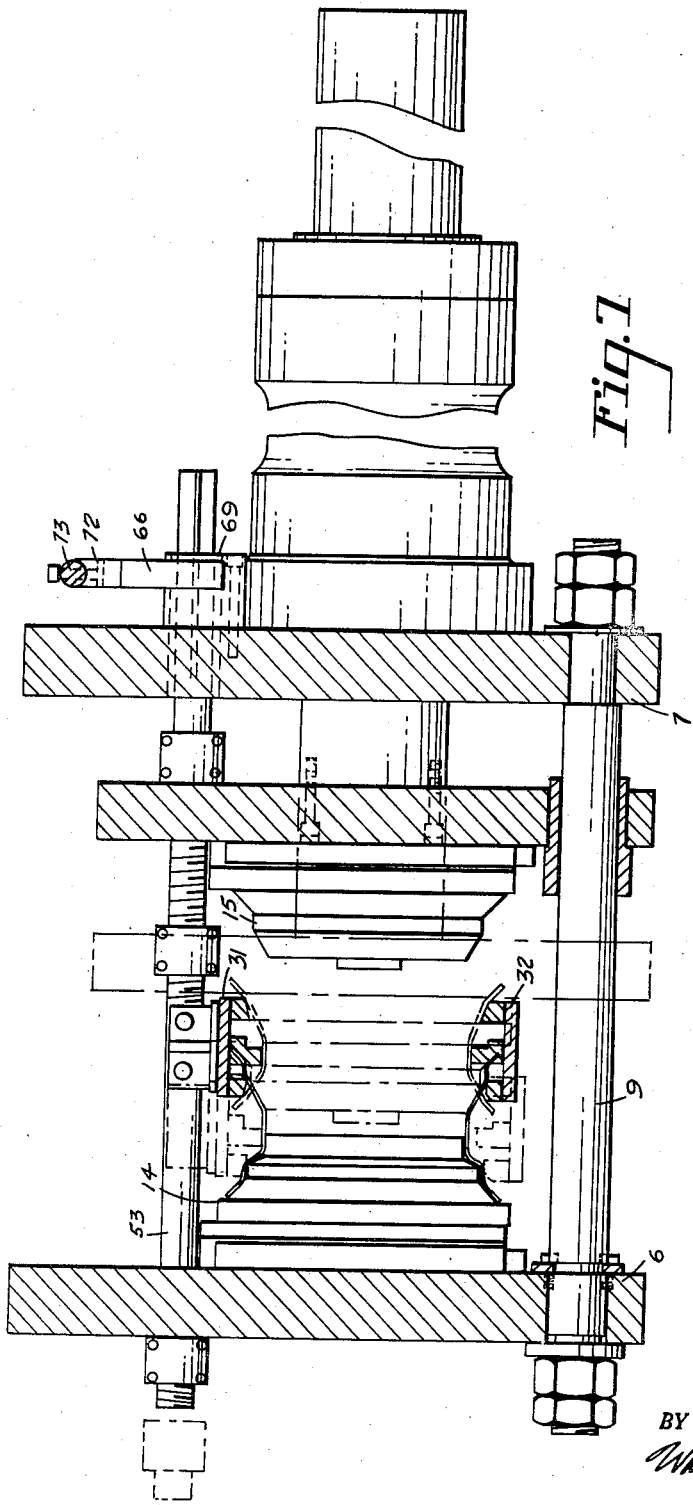

United States Patent Office 2,833,328
Patented May 6, 1958

2,833,328
APPARATUS FOR MANUFACTURING WHEEL RIMS BY A PLURALITY OF DIE MECHANISMS

Frederick P. Sharpe, Dearborn, Mich., assignor to Kelsey-Hayes Company, a corporation of Delaware Application April 13, 1953, Serial No. 348,249

17 Claims. (Cl. 153—2)

The invention relates to apparatus for manufacturing wheel rims and refers more particularly to apparatus for manufacturing vehicle wheel rims of the drop center type.

The invention has for one of its objects to provide an improved apparatus having mechanisms for successively engaging and fashioning the rim blanks and a downwardly inclined guide over which the rim blanks are advanced to the mechanisms under the force exerted by gravity.

The invention has for another object to provide an improved apparatus in which the fashioning mechanisms are dies relatively movable toward and away from each other.

The invention has for still another object to provide an improved apparatus having provision for discharging a rim blank which has become defective by reason of having been transversely split during the operation of the apparatus.

The invention has for another object to provide an improved apparatus having stops engageable with the rib blanks to position the same for engagement by the fashioning mechanisms and having means for moving the stops to release positions substantially simultaneously.

The invention has for further objects to provide an improved guide having guide members provided with the rim blank positioning stops; to provide an improved guide having guide members which serve to disengage the rim blanks from the fashioning mechanisms after the rim blanks have been fashioned; to provide an improved guide having guide members which yieldably engage the rim blanks to compensate for their fashioning; and to provide an improved guide having a guide member which is movable to provide for the discharge of a defective rim blank.

With these and other objects in view, the invention resides in the novel features of construction and combinations and arrangements of parts as more fully hereinafter set forth.

In the drawings:

Figure 1 is a diagrammatic front elevation of an apparatus embodying the invention;

Figures 2A and 2B are front elevations which together show the apparatus of Figure 1 on an enlarged scale;

Figure 4 is an enlarged rear elevation partly in section of a portion of Figure 2A;

Figure 2A:
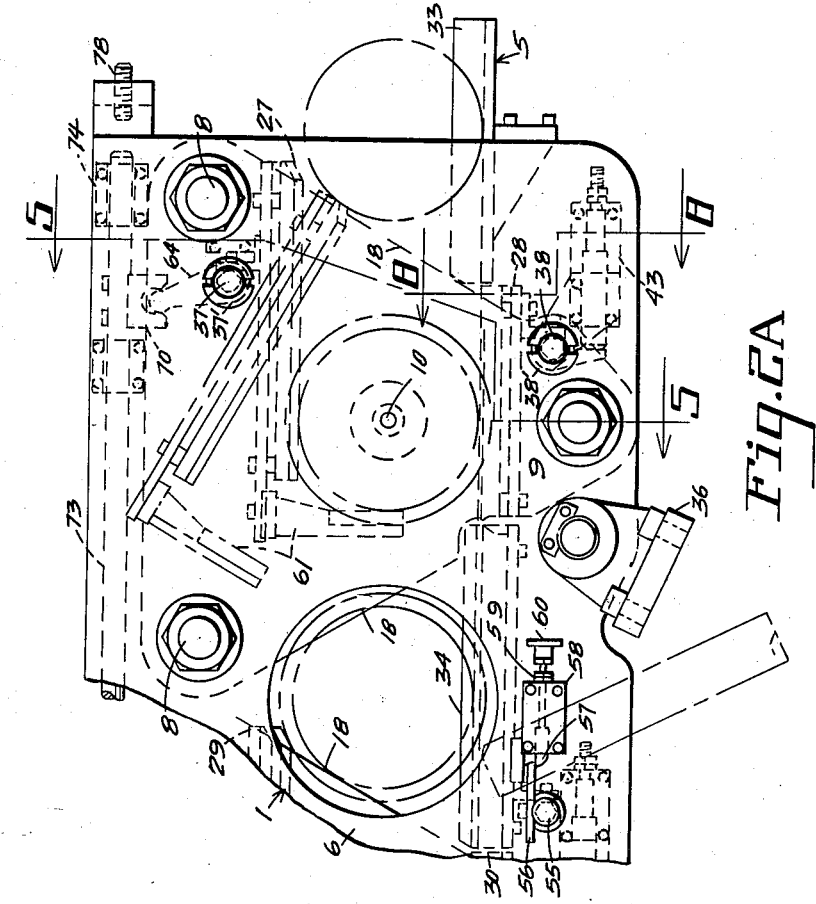
Figure 11:
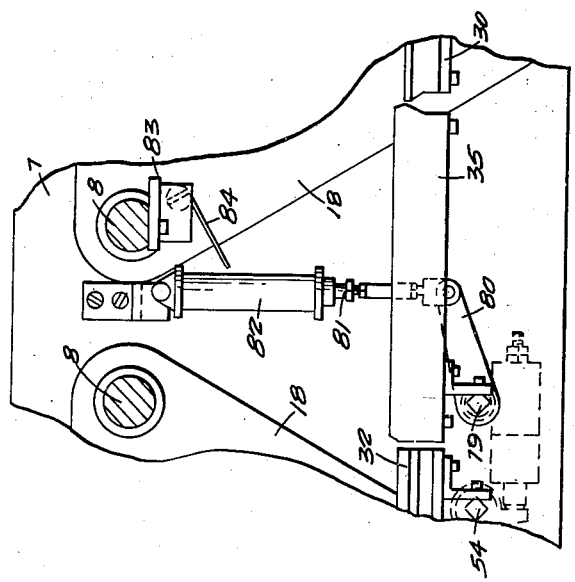
Figure 3A:
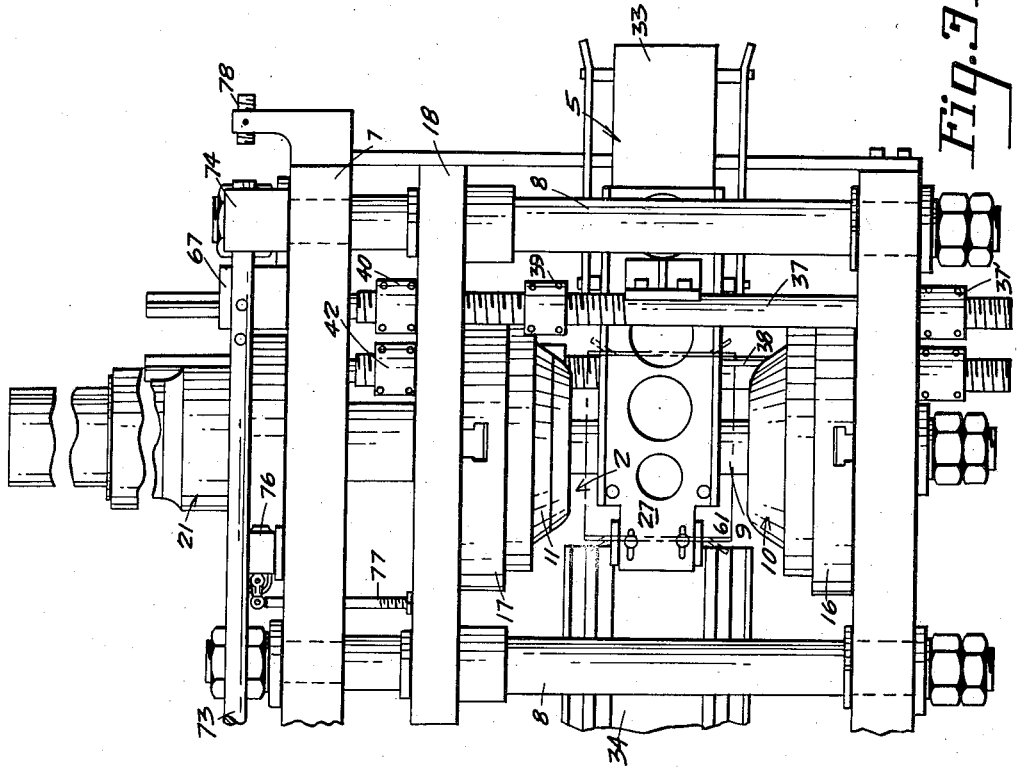
Figures 3A and 3B are top plan views of Figures 2A and 2B.
Figure 9:
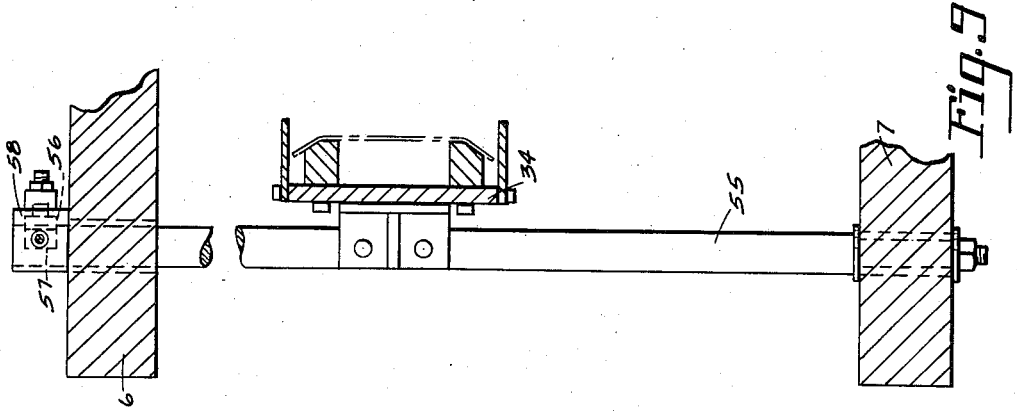
Figure 3B:
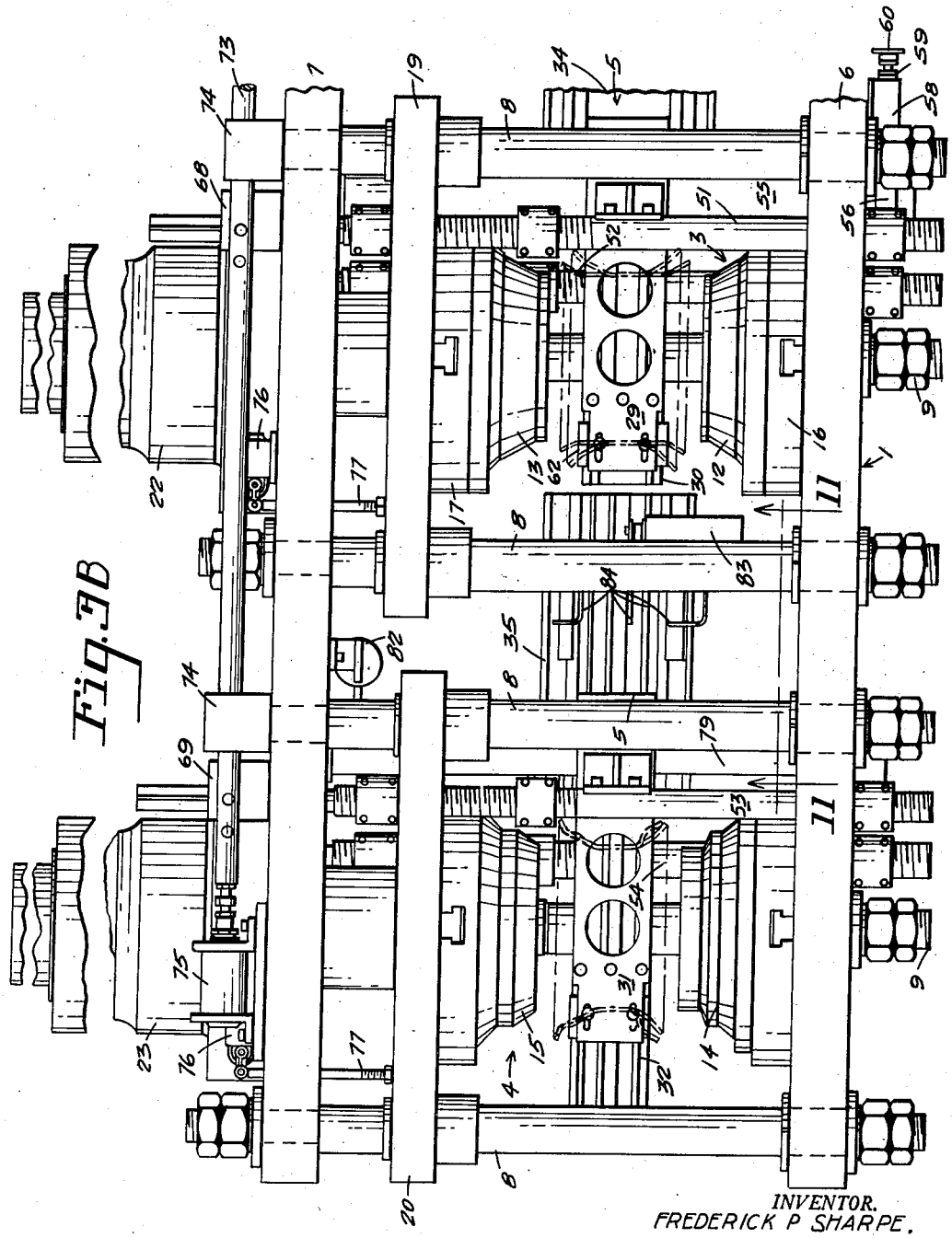
Figure 6:
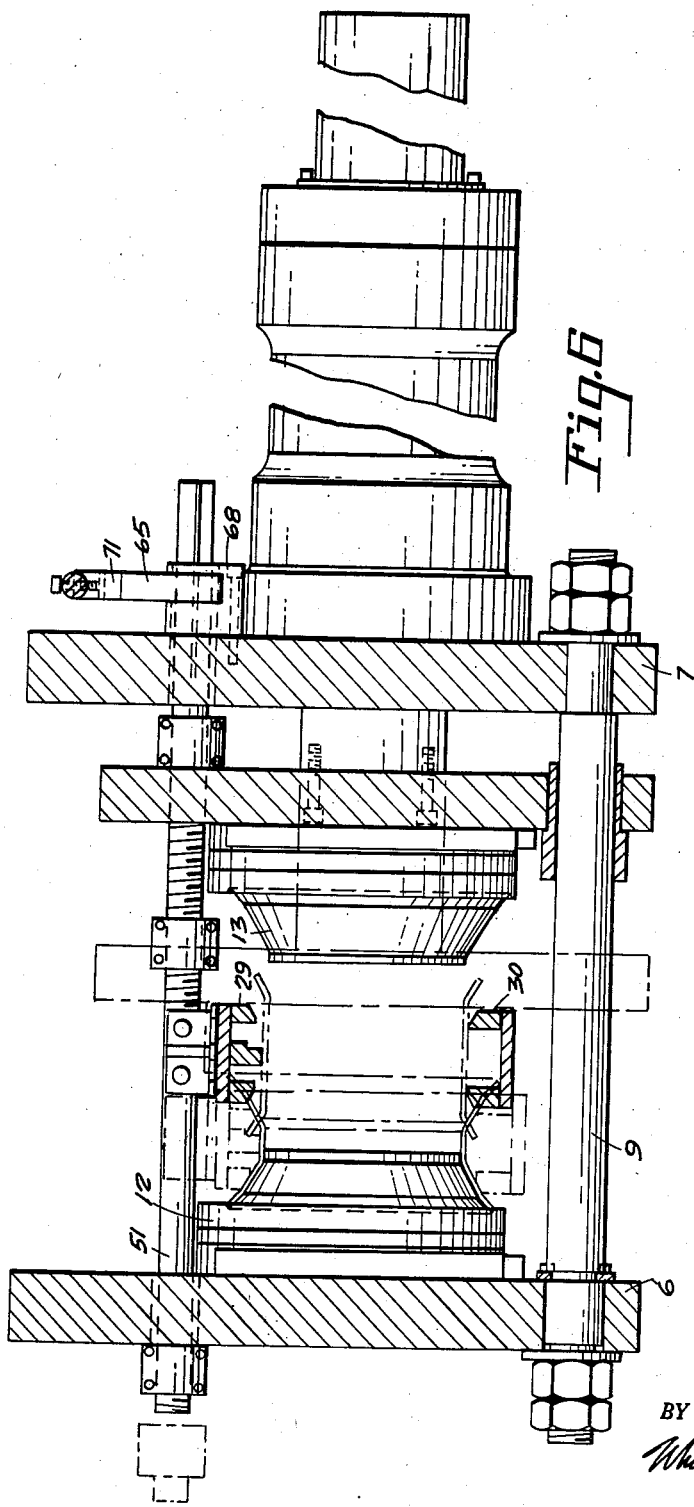

Figures 5, 6, 7, 8, 9, and 10 are cross sections on the lines 5—5, 6—6, 7—7, 8—8, 9—9 and 10—10 of Figures 2A and 2B;

Figure 11 is a cross section on the line 11—11 of Figure 3B.

The apparatus embodying the invention is designed for use in the manufacture of rims by successively engaging and fashioning rim blanks during their advance. As illustrated, the rims are vehicle wheel rims of the drop center type.

The apparatus in general comprises the frame 1, the mechanisms 2, 3, and 4 spaced longitudinally of the frame for successively engaging and fashioning the rim blanks during their advance and the guide 5 extending longitudinally of the frame and over which the rim blanks are adapted to advance. The frame 1 comprises the spaced parallel front and rear side plates 6 and 7 respectively, the upper cross rods 8 and the lower cross rods 9 extending between the front and rear side plates and fixedly secured thereto. The mechanisms 2, 3, and 4 respectively comprise the front and rear dies 10 and 11, the front and rear dies 12 and 13 and the front and rear dies 14 and 15. The dies 10 and 11 of the mechanism 2 are axially aligned and are mounted respectively upon the heads 16 and 17. The head 16 is fixedly secured to the front side plate 6 and the head 17 is fixedly secured to the reciprocable carrier plate 18, which is triangular in shape and is slidably mounted upon a pair of upper cross rods 8 and a single lower cross rod 9. The dies 12 and 13 of the mechanism 3 and also the dies 14 and 15 of the mechanism 4 are mounted in the same manner as the dies 10 and 11 of the mechanism 2. The carrier plates 19 and 20, to which the rear dies 13 and 15 are respectively secured, and the carrier plate 18 are arranged in end to end relation.

For the purpose of reciprocating the carrier plates 18, 19 and 20 to move the rear dies secured thereto laterally of the frame 1 and toward and away from the front dies, there are the fluid pressure actuated devices 21, 22 and 23 respectively. Each device comprises the cylinder 24 fixedly secured to the rear side of the rear side plate 7 and the piston 25 fixedly secured to the associated reciprocable carrier plate. In the present construction each of the devices 21, 22 and 23 is a double acting hydraulic cylinder of conventional construction connected to a suitable source of hydraulic medium under pressure. The movement of the piston forwardly to move the rear die toward the front die is controlled by the nut 26 adjustably threaded on the rod to which the piston is secured and adapted to abut the rear closed end of the cylinder. The return movement of the piston to move the rear die rearwardly away from the front die is limited by abutment of the piston with the rear end of the cylinder. A conventional electronic timer on a suitable control panel controls the flow of the hydraulic medium to and from the opposite ends of the fluid pressure actuated devices by a conventional solenoid operated valve or other conventional means. A conventional starter button is adapted to be depressed to control the initial energization of the timer by a conventional holding relay or other conventional means.

The guide 5 is mounted on the frame between the front and rear side plates and comprises the pairs of upper and lower guide members 27 and 28, 29 and 30, and 31 and 32, the guide member or chute 33 and the two lower guide members 34 and 35. The pair of upper and lower guide members 27 and 28 is movable laterally of the apparatus and is located to guide the rim blank when passing between the front and rear dies 10 and 11 of the mechanism 2. The pair of upper and lower guide members 29 and 30 is movable laterally of the apparatus and is located to guide the rim blank when passing the front and rear dies 12 and 13 of the mechanism 3. The pair of upper and lower guide members 31 and 32 is movable laterally of the apparatus and is located to guide the rim blank when passing between the front and rear dies 14 and 15 of the mechanism 4. The guide member or chute 33 is stationary and is located at the loading end of the apparatus. The lower guide member 34 is between the lower guide members 28 and 30 and the lower guide member 35 is located between the lower guide members 30 and 32. Both of the lower guide members 34 and 35 are held from movement laterally of the apparatus.

The upper rim blank engaging and supporting surfaces of the guide member or chute 33 and the lower guide members 28, 34, 30, 35 and 32 are in substantially the same plane which, as particularly illustrated in Figure 1, is downwardly inclined from the loading end to the unloading end of the apparatus. This is accomplished by correspondingly inclining the frame 1 and mounting the front and rear side plates 6 and 7 upon the supports 36 spaced longitudinally of the plates with the supports near the loading end at a higher elevation than the supports near the unloading end.

Referring to the pair of upper and lower guide members 27 and 28, the upper guide member 27 is fixedly mounted on the upper shaft 37 and the lower guide member 28 is fixedly mounted on the lower shaft 38. These shafts are slidably mounted in the front and rear side plates 6 and 7 respectively and extend through the carrier plate 18. Front and rear collars or nuts 39 and 40 are adjustably threaded on and secured to the upper shaft 37 and front and rear collars or nuts 41 and 42 are adjustably threaded on and secured to the lower shaft 38, the front collars being on the front side of the carrier plate 18 and the rear collars being on the rear side of this carrier plate. The front collars or nuts 39 and 41 in the retracted positions of the parts are spaced from the carrier plate 18 so that upon movement of the carrier plate forwardly or toward the front of the apparatus the carrier plate upon taking up the lost motion abuts the front collars or nuts and thereby moves the upper and lower shafts 37 and 38 forwardly which in turn move the upper and lower guide members 27 and 28 forwardly to their advanced positions. At this time the rear die 11 is in its advanced position and both dies have effected the initial expansion of the opposite edge portions of the rim blank. The advanced positions are predetermined by the nut 26 abutting the rear closed end of the cylinder 24. The rear collars or nuts 40 and 42 in the advanced positions of the parts are spaced from the carrier plate so that upon rearward movement of the carrier plate, it upon taking up the lost motion abuts the rear collars or nuts after the rear die 11 has been moved rearwardly out of the rim blank and thereby moves the upper and lower shafts 37 and 38 rearwardly which in turn move the upper and lower guide members 27 and 28 rearwardly to their retracted positions thereby disengaging the rim blank from the front die 10. The retracted position of the carrier plate and rear die is predetermined by the piston 25 abutting the rear closed end of the cylinder 24 and the retracted positions of the upper and lower shafts 37 and 38 and the upper and lower guide members are predetermined by the collars or nuts 37' and 38' on the shafts 37 and 38 abutting the front side of the front side plate 6.

For the purpose of compensating for the fashioning of the rim blank by the dies 10 and 11, the lower guide member 28 is yieldably supported on the frame of the apparatus so that the portion of the lower guide member engaging and supporting the rim blank during its fashioning by the dies and its subsequent advancement along the lower guide member is yieldable downwardly thereby making provision of the expansion by the dies of the portions of the rim blank resting on the lower guide member. In the present instance, this is accomplished by locating the lower shaft 38 near the end of the lower guide member nearest the loading end of the apparatus and offset toward the loading end from the portion of the lower guide member engaging the expanded portions of the rim blank. Also, there is the device 43 which is operatively connected to the shaft and makes provision for yieldably permitting turning of the shaft and the lower guide member as expansion of the rim blank occurs. In detail, the device comprises the plunger 44 extending into and slidable in the housing 45 which is fixedly secured to the rear side of the rear side plate 7. The plunger has the enlarged portion 46 abutting the free end of the lever or arm 47 which is held from lateral movement by the housing 45 and is rotatable with and slidably engaged by the shaft 38. The plunger also has the reduced portion 48 extending through the closed end of the housing. A compression coil spring 49 located within the housing and encircling the reduced portion 48 abuts the enlarged portion 46 and the closed end of the housing. 50 is a nut adjustably threaded on the reduced portion 48 of the plunger externally of the housing 45 and adapted to abut the closed end of the housing to predetermine the normal position of the lower guide member. In operation, the coil spring 49 may yield if necessary during the fashioning of the rim blank to allow the shaft and lower guide member to turn in a clockwise direction. However, when the fashioned rim blank moves from the lower guide member, the coil spring returns the shaft and lower guide member to normal position as predetermined by the nut 50 abutting the closed end of the housing 45 at which time the lower guide member is ready to receive the following rim blank.

The upper and lower guide members 29 and 30 are fixedly mounted on the upper and lower shafts 51 and 52 respectively which are slidably mounted in the front and rear side plates 6 and 7 and extend through the carrier plate 19. The upper and lower guide members are adapted to be moved forwardly to advanced positions and rearwardly to retracted positions in the same manner as the upper and lower guide members 27 and 28 by means including collars or nuts corresponding to the collars or nuts 39 and 40 and 41 and 42 and engageable by the carrier plate 19. The lower guide member 30 is also yieldably supported in normal position on the frame of the apparatus by a device corresponding to the device 43.

The upper and lower guide members 31 and 32 are fixedly mounted on the upper and lower shafts 53 and 54 respectively which are slidably mounted in the front and rear side plates 6 and 7 and extend through the carrier plate 20. The upper and lower guide members are adapted to be moved forwardly to advanced positions and rearwardly to retracted positions in the same manner as the upper and lower guide members 28 and 29 by means including collars or nuts corresponding to the collars or nuts 39 and 40 and 41 and 42 and engageable by the carrier plate 20. Also the lower guide member is yieldably supported in normal position by a device corresponding to the device 43.

The lower guide member 34 is fixedly mounted near its end nearest the unloading end of the apparatus on the lower shaft 55 which is journalled in the front and rear side plates 6 and 7. To provide for the discharge of a rim blank resting on the lower guide member, it is held in normal position by a spring pressed latch which may be manually moved to release position to allow the lower guide member to swing downwardly so that the rim blank may fall. In detail, the lower shaft 55 carries the lug 56 engaged and supported by the latch 57 slidable in the housing 58. The housing is mounted at the front side of the front side plate 6 and houses a compression coil spring for urging the latch to operative position engaging the under side of the lug. This position is predetermined by the nut 59 threaded on the reduced portion of the latch and abutting the housing. 60 is a handle secured to the reduced latch portion for enabling an operator to move the latch to release position to permit discharge of the rim blank.

The guide member or chute 33 is adapted to receive a transversely welded cylindrical rim blank. This guide member or chute and the lower guide members 28, 34, 30, 35, and 32 in their retracted positions are normally in end-to-end relation with their ends in close proximity and their longitudinal center lines in alignment. The upper rim blank supporting surfaces of these members are inclined downwardly and are approximately co-planar from the loading end to the unloading end of the apparatus so that a rim blank may readily roll over these members under the influence of gravity.

For the purpose of controlling the advance of the rim blanks downwardly along the lower guide members during the operation of the apparatus, the upper guide members 27, 29, and 31 are provided at their ends nearest the unloading end of the apparatus with the depending stops 61, 62, and 63 respectively which are engageable with the rim blanks to position the same for engagement with the front and rear dies of the mechanisms 2, 3 and 4 when the rear dies are moved forwardly. These upper guide members are adapted to be swung to move the stops away from and clear the rim blanks and to move their other ends downwardly to engage the next forward rim blanks. The swinging of the upper guide members 27, 29 and 31 is accomplished by oscillating the shafts 37, 51 and 53 respectively. The rear ends of the shafts slidably extend through and non-rotatably engage the hubs of the levers 64, 65 and 66 which extend into slots in the spacer blocks 67, 68 and 69 fixedly mounted on the rear sides of the rear side plate 7. The free upper ends of the levers are engaged by the yolks 70, 71 and 72 which are mounted upon the rod 73 extending parallel to and at the rear side of the rear side plate 7, and longitudinally slidably engaging the mounting blocks 74 secured to the rear side plate. The rod is adapted to be longitudinally reciprocated by means of the fluid pressure operated device 75 connected to the rod near the unloading end of the apparatus. The fluid pressure operated device is a double acting air cylinder of conventional construction and its operation is controlled by means of the limit switches 76 arranged in series in an electric circuit including an electronic timer of conventional construction on a suitable control panel and controlling the flow of the pressure fluid to and from the ends of the device by a conventional solenoid operated valve or other conventional means. The switches are mounted upon the rear side of the rear side plate 7 and are of conventional construction. They are adapted to be actuated by the rods 77 which extend through the rear side plate and are secured to the carrier plates 18, 19 and 20, there being one limit switch and one associated rod 77 for each carrier plate. The rods actuate the switches during the final portion of the rearward movement of the carrier plates and all of the switches must be actuated before the rod 73 can be moved toward the loading end of the apparatus and the laterally movable upper guide members can be swung to release the rim blanks held by the stops. Therefore, the carrier plates must be in retracted position with the laterally movable guide members in retracted position and in alignment positioning the rim blanks between and free of the front and rear dies of all three mechanisms 2, 3 and 4 before the rod 73 can be so moved. The movement of the rod 73 toward the loading end of the apparatus is limited by the set screw 78.

During the operation of the apparatus a rim blank may become defective by having been transversely split because of some weakness, such as a poor transverse weld, allowing the metal to part. Such a rim blank is oversize. To automatically discharge a defective rim blank of this kind, the lower guide member 35 is mounted to swing downwardly to thereby allow the rim blank upon this lower guide member to drop from the apparatus. As shown, the lower guide member 35 is fixedly mounted at its end nearest the unloading end of the apparatus upon the shaft 79 which is adapted to be oscillated by the lever 80 secured thereto, this lever being connected to the piston rod 81 of the fluid pressure operated device 82. This device is a double acting air cylinder of conventional construction and is controlled by the electric switch 83 having the fingers 84 engageable with and adapted to be swung by a rim blank passing from the lower guide member 30 to the lower guide member 35. The device is pivotally mounted at its upper end upon a bracket at the front side of the rear side plate 6. The switch is mounted upon an upper cross rod 8 and so located that its fingers clear a normal rim blank during its downward movement when resting upon the lower guide member 35 directly beneath the fingers. However, if the rim blank is defective by having become transversely split and oversize, it contacts and swings the fingers to operate the switch which through conventional means allows compressed air to enter the upper end of the air cylinder which lowers the piston rod and swings the lever downwardly to thereby swing the lower guide member downwardly and allow the rim blank to fall by gravity from the apparatus.

In operation, assuming the laterally movable pairs of upper and lower guide members 27 and 28, 29 and 30, and 31 and 32 to be in retracted position and in alignment with the guide member or chute 33 and the lower guide members 34 and 35 and also assuming the stops 61, 62 and 63 to be in lowered operative position, a cylindrical rim blank when placed on the guide member or chute 33 rolls over this guide member or chute and upon the succeeding lower guide member 28 and against the stop 61. Then upon pressing a starter button a conventional electronic timer is electrically energized to start the fluid pressure actuated devices 21, 22 and 23 in operation by a suitable hydraulic medium entering the rear ends of the devices. Upon forward movement of the pistons of the devices the carrier plates 18, 19 and 20 and the associated rear dies 11, 13 and 15 are moved forwardly. The carrier plate 18 after taking up the lost motion between the carrier plate and the front collars or nuts 39 and 41 comes into contact with the front collars or nuts and moves the shafts 37 and 38 and the upper and lower guide members 27 and 28 forwardly in unison with the carrier plate to reach their advanced positions at the time the rear die 11 reaches its advanced position as determined by the nut 26 abutting the rear end of the cylinder 24. During this forward movement the front and rear dies 10 and 11 fashion the rim blank by flaring its edge portions. During the fashioning of the rim blank, the lower guide member 28 may swing downwardly compressing the coil spring 49 to compensate for the enlarging of the edge portions of the rim blank if the portions of the lower guide member engaging the edge portions are not shaped or spaced to accommodate the enlarging. Then under the control of the electronic timer the fluid pressure actuated devices are energized by the hydraulic medium entering the front ends of the devices to move the associated carrier plates and rear dies rearwardly and thereby disengage the rear die 11 from the fashioned rim blank after which the carrier plate 18 comes into contact with the rear collars or nuts 40 and 42 and moves the shafts 37 and 38 and the upper and lower guide members 27 and 28 rearwardly in unison with the carrier plate to their retracted positions as determined by the collars or nuts 37' and 38' abutting the front side plate 6 at the time the rear die reaches its retracted position as determined by the piston 25 abutting the rear end of the cylinder 24. The upper and lower guide members 27 and 28 upon being moved rearwardly disengage the fashioned rim blank from the front die 10 and these guide members in retracted position locate the fashioned rim blank so that when it is released it may roll upon the succeeding lower guide member 34. Assuming that the carrier plates 19 and 20 are also in retracted positions with the pairs of upper and lower guide members 29 and 30 and 31 and 32 also in retracted position and all three rods 77 to have actuated their limit switches 76, so that the electronic timer in the circuit with these switches is energized, the stops 61, 62 and 63 are moved upwardly to release position by swinging the upper guide members 27, 29 and 31 by means of the rod 73 and intermediate mechanism, the rod being moved toward the loading end of the apparatus by the fluid pressure operated device 74 until it hits the set screw 79. The upward movement of the stop 61 releases the fashioned rim blank which rolls upon the lower guide member 34 and engages the end of the next upper guide member 29. Then the rod 73 is returned to its original position under the control of the last-mentioned timer and swings the upper guide members 27, 29 and 31 to lower their stops to operative position at which time the fashioned rim blank rolls upon the lower guide member 30 and against the stop 62. After a sufficient time interval necessary to allow the fashioned rim blank to come to rest against the stop 62, the fluid pressure actuated devices are energized to move their associated carrier plates forward, which take up the lost motion between the carrier plates and the associated upper and lower guide members to move the same forward. The timing is secured by the last-mentioned timer controlling the electrical energization of the first-mentioned timer. The same sequence of steps as that between the fashioning of the rim blank by the dies 10 and 11 and the fashioning by the dies 12 and 13 takes place to again fashion the rim blank by the dies 14 and 15 after which the rim blank is allowed to roll off the lower guide member 32.

The apparatus is designed to operate upon a number of rim blanks at the same time, as shown in Figure 1, with the above described series of steps upon each successive rim blank so that when the dies 14 and 15 of the mechanism 4 are refashioning the rim blank which had been refashioned by the dies 12 and 13 of the mechanism 3, the latter dies are refashioning the rim blank which has been fashioned by the dies 10 and 11 of the mechanism 2 and the last-mentioned dies are initially fashioning another rim blank. The upper guide members 27, 29 and 31, which are swingable in unison, control the intermittent advance of the rim blanks and since these guide members can be swung to raise their stops 61, 62 and 63 only when all the movable rear dies and the pairs of upper and lower guide members are in retracted position, the rim blanks may freely roll upon the next lower guide members.

During the operation of the apparatus, if a rim blank becomes transversely split before it rolls upon the lower guide member 35 it operates the electric switch 83 which controls the operation of the fluid pressure operated device 82 to swing the lower guide member downwardly and allow the defective rim blank to fall by gravity from the apparatus.

Also, if it is desired to remove a rim blank resting upon the lower guide member 34, an operator may pull the handle 60 to release the lower guide member and allow it to swing downwardly so that the rim blank may fall by gravity from the apparatus.

What I claim my invention is:

1. An apparatus for manufacturing wheel rims comprising a downwardly inclined guide having lower guide members for supporting rim blanks and over which the rim blanks are adapted to roll by gravity and upper guide members above certain of said lower guide members, mechanisms spaced longitudinally of said guide for successively engagaing and fashioning the rim blanks during their advance, said upper guide members having stops engageable with the rim blanks to position the same for engagement by said mechanisms, and means for swinging said upper guide members to move said stops to release position at the same time.

2. An apparatus for manufacturing wheel rims comprising a guide having aligned supporting guide members over which rim blanks are adapted to advance, mechanisms spaced longitudinally of said guide for successively engaging and fashioning the rim blanks during their advance, stops engageable with the rim blanks for positioning the rim blanks on said guide for engagement by said mechanisms, one of said supporting guide members being movable from operative position to inoperative position, and means having a control member engageable with and operable by an oversize rim blank on said last-mentioned supporting guide member for moving said last-mentioned supporting guide member from operatve position to inoperative position.

3. An apparatus for manufacturing wheel rims comprising a frame having spaced parallel plates and cross rods extending therebetween, a downwardly inclined guide extending longitudinally of said frame and having lower guide members for supporting rim blanks and over which the rim blanks are adapted to advance, certain of said lower guide members being movable transversely of said plates, dies fixedly mounted on one of said plates, other dies axially aligned with said first-mentioned dies, carrier plates for said other dies slidably mounted on said cross rods and movable transversely of said plates, rods extending transversely of and slidable in said plates and connected to said movable guide members and collars on said last-mentioned rods engageable by said carrier plates for moving said last-mentioned rods by said carrier plates and thereby moving said movable guide members, and means connected to said carrier plates for reciprocating the same and thereby moving said other dies toward and from said first-mentioned dies.

4. An apparatus for manufacturing wheel rims comprising mechanisms spaced longitudinally of said apparatus for successively engaging and fashioning rim blanks, said mechanisms each having a stationary die and a movable die, a downwardly inclined guide for the rim blanks having pairs of upper and lower guide members and intermediate lower guide members, said first-mentioned and last-mentioned lower guide members having their rim blank supporting surfaces normally in substantially the same downwardly inclined plane and said upper guide members having stops engageable with the rim blanks for positioning the rim blanks for engagement by said mechanisms, means for swinging said upper guide members to move said stops to release position and means for moving said movable dies toward and away from said stationary dies and also moving said pairs of upper and lower guide members toward and away from said stationary dies.

5. An apparatus for manufacturing wheel rims comprising a mechanism for fashioning rim blanks, upper and lower guide members cooperable to guide the rim blanks past said mechanism, said upper guide member having a depending stop engageable with the rim blanks for positioning the rim blanks for engagement by said mechanism, and means for swinging said upper guide member to raise said stop to release position.

6. An apparatus for manufacturing wheel rims comprising a mechanism for fashioning rim blanks, said mechanism having a stationary die and a movable die, upper and lower guide members for the rim blanks located between said dies, means for moving said movable die toward said stationary die and lost motion connections between said upper and lower guide members and die, moving means for moving said upper and lower guide members toward and away from said stationary die.

7. An apparatus for manufacturing wheel rims comprising a guide having aligned lower guide members for supporting rim blanks and over which the rim blanks are adapted to advance, one of said lower guide members being swingable downwardly to allow a rim blank supported thereby to drop off said last-mentioned lower guide member, and means having a control member engageable by a rim blank when oversize for swinging said last-mentioned lower guide member downwardly.

8. An apparatus for manufacturing wheel rims comprising a downwardly inclined guide having aligned lower guide members for supporting rim blanks and over which the rim blanks are adapted to roll, one of said lower guide members being swingable downwardly to allow a rim blank supported thereby to drop off said last-mentioned lower guide member, a fluid pressure actuated device connected to said last-mentioned lower guide member for swinging the same and control means for said device having a control member engageable by a rim blank when oversize.

9. An apparatus for manufacturing articles comprising a mechanism for fashioning the articles, upper and lower guide members cooperable to guide the articles past said mechanism, said upper guide member having a stop engageable with the articles for positioning the latter for engagement by said mechanism, and means for moving said upper guide member to move said stop to release position.

10. An apparatus for manufacturing articles comprising a mechanism for fashioning the articles, said mechanism having a stationary die and a movable die, a guide member for the articles located between said dies, means for moving said movable die toward said stationary die, and a lost motion connection between said guide member and die moving means for moving said guide member toward and away from said stationary die.

11. An apparatus for manufacturing articles comprising a guide having aligned lower guide members for supporting the articles and over which the articles are adapted to advance, one of said lower guide members being movable from operative to inoperative position, and means having a control member engageable with and operable by an oversize article for moving said last-mentioned lower guide member from operative to inoperative position.

12. An apparatus for manufacturing wheel rims comprising a mechanism having laterally spaced dies, a member for supporting a rim blank between said dies, said dies being internally engageable with the rim blank to expand the latter and being relatively movable toward each other and into engagement with the rim blank and away from each other and out of engagement with the rim blank, means for relatively moving said dies toward and away from each other, and means for yieldably supporting said member to compensate for the expansion of the rim blank by said dies.

13. An apparatus for manufacturing wheel rims comprising a mechanism having laterally spaced dies, a guide having aligned guide members positioned to guide a rim blank past said mechanism, one of said guide members being adapted to support a rim blank between said dies, said dies being internally engageable with the rim blank supported on said one guide member to expand the rim blank and being relatively moveable toward each other and into engagement with the rim blank and away from each other and out of engagement with the rim blank, means for relatively moving said dies toward and away from each other, and means for yieldably supporting said one guide member to compensate for the expansion of the rim blank by said dies.

14. An apparatus for manufacturing wheel rims comprising rim forming means, a member for supporting a rim blank in operative relation to said rim forming means, said rim forming means being engageable with the rim blank to expand the latter, and means for yieldably supporting said member to compensate for the expansion of the rim blank by said rim forming means.

15. An apparatus for manufacturing articles comprising a mechanism for fashioning the articles, said mechanism including spaced article forming means, a support for the articles located between said article forming means, means for moving one of said article forming means toward the other, and a lost motion connection between said support and said moving means for moving said support toward the said other of said article forming means.

16. An apparatus for manufacturing wheel rims comprising a guide over which rim blanks are adapted to move, mechanisms spaced longitudinally of said guide for successively engaging and fashioning the rim blanks during their advance, members alternately movable between first and second positions respectively engageable with certain rim blanks for holding the latter in locations for engagement by said mechanisms and engageable with the rim blanks next succeeding said certain rim blanks for holding them in other locations in advance of said first-mentioned locations, and means for moving said members between said first and second positions.

17. An apparatus for manufacturing wheel rims comprising a lower guide over which rim blanks are adapted to move, mechanisms spaced longitudinally of said lower guide for successively engaging and fashioning the rim blanks during their advance, aligned upper guides cooperable with said lower guide in guiding the movement of the rim blanks, said upper guides being alternately movable between first and second positions, said upper guides having means engageable, in said first position, with certain rim blanks for holding the latter in locations for engagement by said mechanisms and having means engageable, in said second position, with the rim blanks next succeeding said certain rim blanks for holding them in other locations in advance of said first-mentioned locations, and means for simultaneously moving said members between said first and second positions.

References Cited in the file of this patent

UNITED STATES PATENTS

| | | |
|---|---|---|
| 946,584 | Smith | Jan. 18, 1910 |
| 1,118,590 | Sharp | Nov. 24, 1914 |
| 1,144,839 | Guenther | June 29, 1915 |
| 1,275,867 | Davis | Aug. 13, 1918 |
| 1,819,622 | Roberts | Aug. 18, 1931 |
| 1,939,577 | Sneed | Dec. 12, 1933 |
| 2,004,816 | Lindgren | June 11, 1935 |
| 2,181,020 | Le Jeune | Nov. 21, 1939 |
| 2,269,474 | Nordquist | Jan. 13, 1942 |
| 2,660,076 | May | Nov. 24, 1953 |